US008611417B2

(12) United States Patent
Pantelidou et al.

(10) Patent No.: US 8,611,417 B2
(45) Date of Patent: Dec. 17, 2013

(54) USING DECODING PROGRESS TO ADAPT TRANSMISSION RATE IN A MULTICAST TRANSMISSION

(75) Inventors: Anna Pantelidou, Oulu (FI); Sami-Jukka Hakola, Kempele (FI); Timo Koskela, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/418,746

(22) Filed: Mar. 13, 2012

(65) Prior Publication Data

US 2013/0051388 A1  Feb. 28, 2013

(30) Foreign Application Priority Data

Aug. 24, 2011 (GB) .................................. 1114635.4

(51) Int. Cl.
  *H04B 1/66* (2006.01)
(52) U.S. Cl.
  USPC ...................................... 375/240.02; 370/465
(58) Field of Classification Search
  None
  See application file for complete search history.

(56) References Cited

U.S. PATENT DOCUMENTS

| 6,072,830 A * | 6/2000 | Proctor et al. ........... 375/240.22 |
| 2006/0150055 A1 * | 7/2006 | Quinard et al. ............... 714/752 |
| 2007/0261112 A1 * | 11/2007 | Todd et al. ....................... 726/11 |
| 2009/0158063 A1 * | 6/2009 | Wang et al. .................... 713/300 |
| 2009/0213775 A1 * | 8/2009 | Rey et al. ........................ 370/312 |
| 2010/0037112 A1 * | 2/2010 | Graumann ...................... 714/748 |
| 2010/0103831 A1 * | 4/2010 | Caldwell et al. ............... 370/252 |
| 2011/0286333 A1 * | 11/2011 | Rey et al. ....................... 370/235 |
| 2012/0076199 A1 * | 3/2012 | Gao et al. .................. 375/240.02 |
| 2012/0106483 A1 * | 5/2012 | Zhang et al. ................... 370/329 |

FOREIGN PATENT DOCUMENTS

| CN | 101938334 | 1/2011 |
| WO | WO 2010/025362 A2 | 3/2010 |
| WO | WO 2011/043755 A1 | 4/2011 |

OTHER PUBLICATIONS

Ho et al, A random linear network coding approach to multicast, Oct. 2006, vol. 52, 18 pages.*

* cited by examiner

*Primary Examiner* — Ayaz Sheikh
*Assistant Examiner* — Mounir Moutaouakil
(74) *Attorney, Agent, or Firm* — Stanton IP Law

(57) ABSTRACT

Exemplary embodiments are concerned with method of controlling transmission of a set of transmissions from a source device to at least one destination device according to a multicast transmission scheme, the set of transmissions including random linear network coded packets that are to be multicast by the source device to the destination devices. These embodiments differ from this conventional approach in that the number of packets that are encoded for multicast transmission or the rate of transmission thereof is configured using feedback from the destination devices regarding their progress in decoding a previously multicast set of transmissions.

17 Claims, 7 Drawing Sheets

USING DECODING PROGRESS TO ADAPT TRANSMISSION RATE IN A MULTICAST TRANSMISSION

TECHNICAL FIELD

The present invention relates to methods, apparatus and a computer readable medium for controlling transmission of a set of transmissions from a source device to at least one destination device according to a multicast transmission scheme, and has particular application when the channel conditions between the source device and the destination device varies over time.

BACKGROUND

As is well known, multicast is the delivery of a message or information from a source to a group (one or more) of destination devices simultaneously in a single transmission from the source. Copies of the transmission are created automatically in other network elements, such as routers, according to the topology of the network.

Multicasting is of particular importance not only due to the increasing number of multicast applications, such as video conferencing, video gaming, content distribution, etc., but also because several network control mechanisms, such as those needed for timing synchronization, beaconing, etc., are multicast in nature.

To date reliable multicast has not been standardized because current reliable multicast schemes incur significant overhead in terms of acknowledgements: traditionally, every packet that is multicast has to be acknowledged ("ACK") by each destination device that has registered for the multicast content. In a wireless network such as an 802.11 network and for a large number of destination devices this approach does not scale well and creates a large amount of traffic consisting solely of ACKs. This is commonly referred to as "ACK implosion". When the direct and feedback channels are on the same frequency or when the bandwidth/rate of the feedback channel is very low this can significantly reduce performance, e.g., throughput, delay. Known solutions to the ACK implosion problem include the following:

1) Forward Error Correction (FEC) Based multicast: In this scheme the protocol is based on UDP and thus it does not involve transmission of ACKs. FEC gives the capability to a packet to recover from some errors, but precisely because the scheme does not involve ACKs, this approach does not provide full reliability, and therefore it is not appropriate for multicast applications where reliable transmission is a requirement (e.g., for multicasting movies to movie theaters where a high movie quality is expected). Furthermore, it introduces large overheads since extra bits of coding (FEC) need to be added in the original packets which increases the number of bits that need to be effectively communicated.
2) NACK-based reliable multicast: In this scheme, each destination signals the source in relation to packets it did not receive (NACK) and sends a single acknowledgement (ACK) at the end of the transmission to indicate that all the transmitted packets have been successfully received. This scheme is mainly suitable for situations in which a multicast packet is lost in transmission rather than at the point of receipt by a given destination device. Each destination device is configured to transmit a NACK with a random delay, such that, when the source receives the first NACK it multicasts the packet again. In theory this prevents the other destination devices to send unnecessary NACK packets, but when the channels between the source and individual destination devices are unreliable it can lead to a problem of NACK implosion.
3) Network Coding approaches: Random Linear Network Coding (RLNC) has been recently introduced as a means to provide reliability in wireless multicasting. In this approach, the source creates "generations" of K packets, where each generation is a subset of the packets in its queue. The packets within a given generation are randomly linearly combined, which is to say that at each of a series of timeslots each packet in a generation is multiplied with a random coefficient, chosen randomly and uniformly from an M-ary field, and subsequently the modulo M-sum of the latter is sent through the network to each destination device. In this way, for every generation of K packets $s_1, s_2, \ldots, s_k$ the source sends $\Sigma_{i=1}^{K} \alpha_i s_i$ packets, each of which has the same size as the original packets, where the coefficients $\alpha_i$ belong in an M-ary field and where the sum is modulo M. Each destination device needs to know these random coefficients in order decode the packets it receives from the source. The coefficients may be appended to the header of the encoded packets sent from the source to the destination devices. Alternatively the source can send the destination device a random seed so that both the sender and the destination device can create the same random coefficients. Each destination device creates a matrix of the received coefficients where each vector of coefficients used to encode the packets of a generation comprises a row of this matrix. At each timeslot in the series, and upon reception of a broadcast transmission of a coded packet from the source, each destination device sends feedback to the source as to whether it was able to decode the original K packets or whether it needs another coded packet. When a destination device is able to invert its corresponding matrix (that is, when the number of linearly independent rows of the matrix equals the generation size K), it notifies the source that it is able to decode the original K packets. Once the source receives such a feedback message from every destination, it knows that it can proceed to encode the next generation of packets. Otherwise, it transmits another sequence of coded packets before it solicits feedback again from the destination devices. This enhancement of Random Linear Network Coding provides an improvement over the ACK/NACK approaches since an acknowledgement is sent after several transmissions instead of after every transmission.

A problem with known RLNC multicasting schemes in realistic time-varying channel conditions is that configuration and transmission of the randomly linearly combined packets does not take account of the dynamic channel conditions.

There is therefore a need to provide an improved reliable multicast scheme.

SUMMARY

Exemplary embodiments of the invention provide methods, apparatus and a computer readable medium for controlling transmission of a set of transmissions from a source device to at least one destination device according to a multicast transmission scheme according to the appended claims.

In a first exemplary embodiment of the invention there is a method of controlling transmission of a set of transmissions from a source device to at least one destination device according to a multicast transmission scheme, the set of transmissions comprising a configurable number of random linear network coded packets that are to be multicast by the source device to said at least one destination device at a configurable transmission rate, the method comprising:

receiving from said at least one destination device, data indicative of progress in decoding a previously transmitted set of transmissions by said at least one destination device; and selectively adapting one of transmission rate for a current set of transmissions and number of random linear network coded packets in the current set of transmissions on the basis of the received data.

In a second exemplary embodiment of the invention there is apparatus for controlling transmission of a set of transmissions from a source device to at least one destination device according to a multicast transmission scheme, the set of transmissions comprising a configurable number of random linear network coded packets that are to be multicast by the source device to said at least one destination device at a configurable transmission rate, the apparatus comprising a processing system, the processing system comprising at least one processor and a memory storing a set of computer instructions, in which the processing system is arranged to:

receive, from said at least one destination device, data indicative of progress in decoding a previously transmitted set of transmissions by said at least one destination device; and selectively adapt one of transmission rate for a current set of transmissions and number of random linear network coded packets in the current set of transmissions on the basis of the received data.

A third exemplary embodiment of the invention comprises a computer readable memory storing a computer program, the computer program comprising a set of instructions to be executed by a computing device, the computing device being arranged to control transmission of a set of transmissions from the computing device to at least one destination device according to a multicast transmission scheme, the set of transmissions comprising a configurable number of random linear network coded packets that are to be multicast by the computing device to the destination devices at a configurable transmission rate, wherein, when the set of instructions are executed by the computing device, the computing device is caused to perform the steps of:

receiving, from said at least one destination device, data indicative of progress in decoding a previously transmitted set of transmissions by said at least one destination device; and selectively adapting one of transmission rate for a current set of transmissions and number of random linear network coded packets in the current set of transmissions on the basis of the received data.

Further features and advantages of the invention will become apparent from the following description of preferred embodiments of the invention, given by way of example only, which is made with reference to the accompanying drawings.

DETAILED DESCRIPTION

Exemplary embodiments are concerned with method of controlling transmission of a set of transmissions from a source device to at least one destination device according to a multicast transmission scheme, the set of transmissions comprising random linear network coded packets that are to be multicast by the source device to the at least one destination device. Certain embodiments of the invention are particularly suitable for multicasting in mobile wireless networks, such as a Universal Terrestrial Radio Access Network (UTRAN) and a Long Term Evolution network (LTE: evolved UTRAN), and in Wireless LAN (WLAN) networks.

Figure 1:
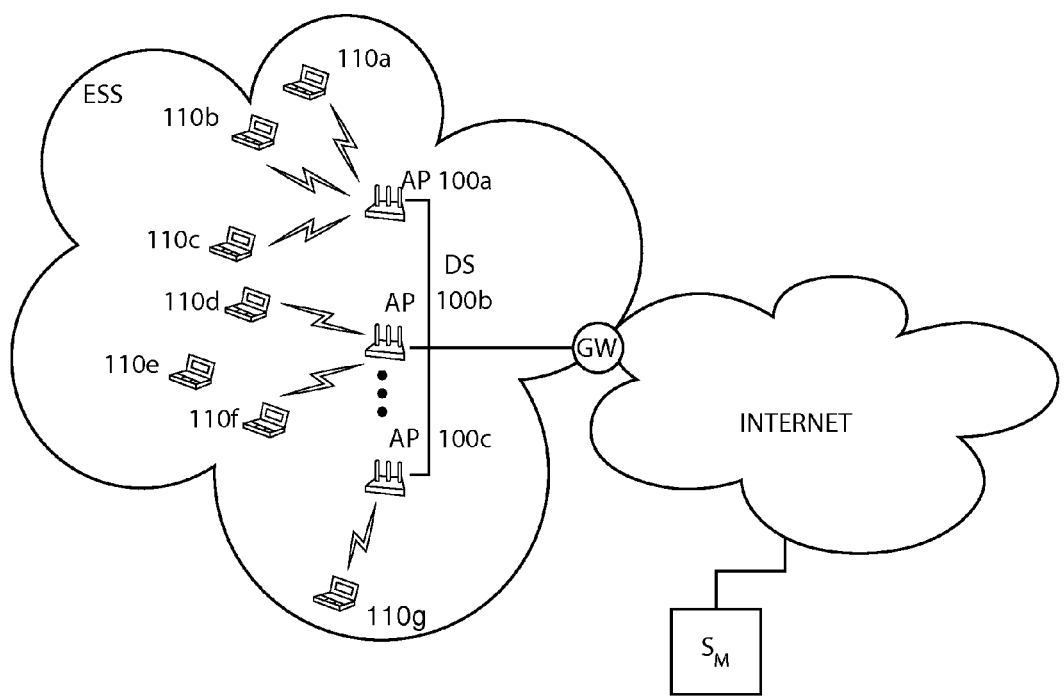
FIG. 1 is a schematic block diagram showing an exemplary network environment in which one or more sources are configured to multicast content to one or more destination devices that have registered for the content.

FIG. 1 shows various source devices $100a$, $100b$, $100c$ connected by a Distributed System DS that are each configured to multicast content in a Wireless LAN (WLAN) to at least one destination device $110a$, ..., $110g$ within an Extended Service Set (ESS). These access points $100a$, $100b$, $100c$ receive packets from a master source $S_M$, which is typically an Internet server broadcasting content such as video to destination devices that have registered to receive the content. Since the destination devices $110a$, ..., $110g$ are attached to an Access Point AP within the ESS, the AP to which the relevant destination device is attached is responsible for multicasting the content directly thereto.

Channels exist between a respective source $100a$, $100b$, $100c$ and its destination device, or devices. In the case shown in FIG. 1, in which the source devices are located in a wireless network such as an 802.11 network, the channels comprise radio links between a radio access node AP acting as the source and a given destination device. For other, non-radio, networks, these channels can comprise routers and other network components that enable the content transmitted by the source to be received by the individual destination devices.

While FIG. 1 shows three AP $100a$, $100b$, $100c$, i.e. sources, it is to be understood that embodiments of the invention apply to any one of these sources, and for clarity purposes the following description will make reference to a single source (with generic reference number 100). Further, while FIG. 1 shows the sources, or Access Points (AP), multicasting to one-or-more destination devices, the following description will assume that the source multicasts to two destination devices.

The source 100 employs random linear network coding to multicast the content in its buffer to the destination devices that are interested in the content. In an exemplary embodiment the source 100 employs a feedback mechanism in order to configure transmission parameters for the content. This feedback mechanism will be described in detail below, but first, conventional coding and decoding of packets will be briefly described.

As explained in the background section, when preparing to multicast packets using a random linear network coding scheme, the source 100 first selects a "generation" of K packets, $s_1, s_2, \ldots, s_k$, from packets in its queue. A generation of K packets is randomly linearly combined, which is to say that each packet $s_1, s_2, \ldots, s_k$ in a generation is multiplied with a random coefficient, chosen randomly and uniformly from an M-ary field, and subsequently the modulo M-sum of the latter is sent through the network to each destination device, i.e., for every generation of K packets $s_1, s_2, \ldots, s_k$ the source sends $\Sigma_{i=1}^{K} \alpha_i s_i$, where the coefficients $\alpha_i$ belong in an M-ary field and where the sum is modulo M.

Each destination device 110a, 110b creates a matrix of coefficients on the basis of the encoded vectors $y_i$ that it receives, one after the other, and the coefficients $\alpha_i$. For each set of coefficients, each destination device 110a, 110b adds a row in the matrix of coefficients. Once the matrix of coefficients is invertible (that is the number of linearly independent rows equals K) the destination device can decode the original packets, $s_1, s_2, \ldots, s_k$ since $$\begin{pmatrix} y_1 \\ y_2 \\ \vdots \\ y_K \end{pmatrix} = \begin{pmatrix} \alpha_{11} & \cdots & \alpha_{1K} \\ \vdots & \ddots & \vdots \\ \alpha_{K1} & \cdots & \alpha_{KK} \end{pmatrix} \begin{pmatrix} s_1 \\ s_2 \\ \vdots \\ s_K \end{pmatrix} \Leftrightarrow \begin{pmatrix} s_1 \\ s_2 \\ \vdots \\ s_K \end{pmatrix} = \begin{pmatrix} \alpha_{11} & \cdots & \alpha_{1K} \\ \vdots & \ddots & \vdots \\ \alpha_{K1} & \cdots & \alpha_{KK} \end{pmatrix}^{-1} \begin{pmatrix} y_1 \\ y_2 \\ \vdots \\ y_K \end{pmatrix}$$

The matrix A is invertible once its rank is equal to K, that is, equal to the number of packets in the generation. Once a given destination device is able to invert its corresponding matrix A it notifies the source 100 that it is able to decode the original K packets. The notification can be transmitted to the source in a coordinated way or through random access. Once all of the destination devices 110a, 110b have notified the source 100 that the original K packets can be decoded, the source 100 configures a next generation of K packets and multicasts these to the destination devices 110a, 110b.

Exemplary embodiments differ from this conventional approach in that the number of packets that are encoded for multicast transmission or the rate of transmission thereof is configured using feedback from the destination devices regarding their progress in decoding a previous set of multicast transmissions. In the exemplary embodiments this progress is monitored based on the number of randomly independent rows of the matrix A constructed by each destination device.

This process will now be described with reference to FIG. 2, which is a logic flow diagram that describes exemplary embodiments of the invention in broad terms from the perspective of the source 100. In step 200, the source 100 receives data indicative of progress in decoding a previously transmitted set of transmissions by said at least one destination device. As described above, this progress information may be provided via the number of linearly independent rows of matrix A maintained by the at least one destination device. Then, and on the basis of the received progress information, at step 202 the source 100 selectively adapts one of transmission rate for a current set of transmissions and number of random linear network coded packets in the current set of transmissions.

In at least some network configurations the source 100 will be transmitting the set of transmissions to a plurality of destination devices, in which case the source 100 receives decoding performance information from each of the destination devices, and selectively adapts one of the transmission rate for a current set of transmissions and the number of random linear network coded packets in the current set of transmissions on the basis of the poorest level of progress in decoding the previously transmitted set of transmissions by all of the destination devices.

In this way, exemplary embodiments of the invention control transmission parameters comprising transmission rate and/or number of random linear network coded packets that are multicast to destination devices on the basis of the channel conditions between the source and destination devices. These channel conditions are determined from the data received from the destination devices indicating progress in decoding a previously transmitted set of transmissions by the destination devices. By utilising feedback from a previously transmitted set of transmissions to determine how to configure the transmission rate or number of random linear network coded packets for a current set of transmissions, embodiments of the invention are able to take account of time-varying channel conditions when configuring the transmission parameters and thus improve known methods.

Further, exemplary embodiments provide an improvement over known acknowledgement methods such as the aforementioned ACK or NACK schemes, as the destination device can be configured to notify to the source the progress in decoding a previously transmitted set of transmissions by said destination device. Thus the "acknowledgement" scheme utilised in embodiments of the invention is based on a set of transmissions, rather than being configured on a per packet basis.

The transmission rate can be adapted within an upper transmission rate and a lower transmission rate on the basis of said data indicative of progress in decoding a previously transmitted set of transmissions by said at least one destination device. For example, the transmission rate can be increased up to a maximum value given by said upper transmission rate in the event that said data indicative of progress in decoding a previously transmitted set of transmissions by said at least one destination device exceeds a predetermined threshold. For the aforementioned network configurations in which the source 100 multicasts to a plurality of destination devices, and receives decoding performance from each destination device, the transmission rate can be increased in the event that the number of packets that can potentially be decoded by all destination devices exceeds a threshold number of random linear network coded packets, with the result that available channel resources are utilised efficiently. This feature is described below with reference to steps 312 and 316 of FIG. 3b.

Further, the transmission rate can be decreased down to a minimum value given by said lower transmission rate in the event that said data indicative of progress in decoding a previously transmitted set of transmissions by said at least one destination device is less than a predetermined threshold. For the aforementioned network configurations in which the source 100 multicasts to a plurality of destination devices, and receives decoding performance from each destination device, the transmission rate can be decreased in the event that the decoding progress by any given destination device is below a threshold number of random linear network coded packets. This improves channel reliability when a particular channel appears to be "highly erroneous". This feature is described below with reference to steps 318 and 322 of FIG. 3b.

The number of transmissions in the current set is selected on the basis of said data indicative of progress in decoding a previously transmitted set of transmissions by said at least one destination device. For example, the data indicative of progress in decoding a previously transmitted set of transmissions by said at least one destination device can be used to determine a first number, said first number corresponding to a number of previously transmitted random linear network coded packets that have yet to be decoded, and to determine a second number, said second number corresponding to a number of extra random linear network coded packets that are to be transmitted, in which said number of transmissions in the current set comprises the first number and the second number. In the description relating to FIGS. 3a-3c the first number is referred to as parameter "packets_undelivered" while the second number is referred to as an "offset" parameter.

For example, the second number is selectively increased in the event that:

a) said data indicative of progress in decoding a previously transmitted set of transmissions by said at least one destination device is less than a predetermined threshold; and b) the rate of transmission for said previously transmitted packets is equal to a predetermined lower rate of transmission.

Thus, in this arrangement, if the aforementioned transmission rate cannot be reduced any further and yet the decoding performance is still below the decoding threshold the second number is increased. For the aforementioned network configurations in which the source 100 multicasts to a plurality of destination devices and receives decoding performance from each destination device, the number of random linear network coded packets selected for transmission, one after another, in the next instance of the broadcast process, is increased, thereby increasing the chance of a destination device with the worst channel conditions successfully receiving and decoding remaining data. This is described below with reference to steps 318 and 320 of FIG. 3b.

Conversely, the second number is selectively decreased in the event that:

a) said data indicative of progress in decoding a previously transmitted set of transmissions by said at least one destination device exceeds a predetermined threshold; and b) the rate of transmission for said previously transmitted packets is equal to a predetermined upper rate of transmission.

Thus, in this arrangement, if the aforementioned transmission rate cannot be increased any further and the decoding performance is above the decoding threshold the second number is decreased. For the aforementioned network configurations in which the source 100 multicasts to a plurality of destination devices and receives decoding performance from each destination device, the number of random linear network coded packets selected for transmission, one after another, in the next instance of the broadcast process, can be reduced. This ensures more efficient usage of channel capacity, since this effectively decreases the chance that packets from a given generation that have already been successfully decoded by the destination devices are transmitted. This is described below with reference to steps 312 and 314.

Receipt of said data indicative of progress in decoding a previously transmitted set of transmissions by said at least one destination device is configured to occur after transmission of the previously transmitted set of transmissions. As a result, feedback from destination devices in respect of a previously transmitted set of transmissions can only occur after complete transmission thereof by the source 100.

The number of transmissions in a set, previous or otherwise, is equal to the aforementioned first and second number that applies for that set; thus the number of transmissions making up the previous set, and that were transmitted one after the other before feedback was requested from the destination devices, is determined based on the poorest level of progress in decoding by all of the destination devices at the point of configuring the previous set of transmissions (first number) as well as on an offset parameter that was determined by the channel conditions of the worst destination device and the transmission rate (second number) at the point of configuring the previous set of transmissions. As mentioned above, feedback from destination devices in respect of a previously transmitted set of transmissions can only occur after complete transmission thereof; thus the gathering of feedback regarding the previous set of transmissions is dependent on channel conditions that existed at the point of configuring the previous set of transmissions.

This feedback may be gathered according to one of several of mechanisms, such as broadcasting a request message by the source 100 to each destination device after transmission of said previously transmitted set of transmissions, said request message requesting data indicative of progress in decoding a previously transmitted set of transmissions by said at least one destination device. In this arrangement, the mechanism by which and when "acknowledgement" messages are transmitted is a request, or pull, mechanism. This therefore means that the acknowledgement mechanism is within the control of the broadcasting device, namely source 100.

It is to be noted that, a "previously transmitted set of transmissions" and a "current set of transmissions" are defined in relation to the point at which feedback is requested from a destination device. Thus, a set of transmissions that is multicast prior to the request for decoding performance is considered a "previously transmitted set of transmissions" within the meaning of the passages above, while a set of transmissions that is multicast after the request for decoding performance (and on the basis of this decoding performance) is considered the "current set of transmissions".

As will be appreciated from the foregoing and a review of selective adaptation step 202 shown in FIG. 2, a current set of transmissions is configured on the basis of decoding performance received from the destination devices; this current set is then subsequently multicast by the source 100 to the destination devices.

Figure 3A:
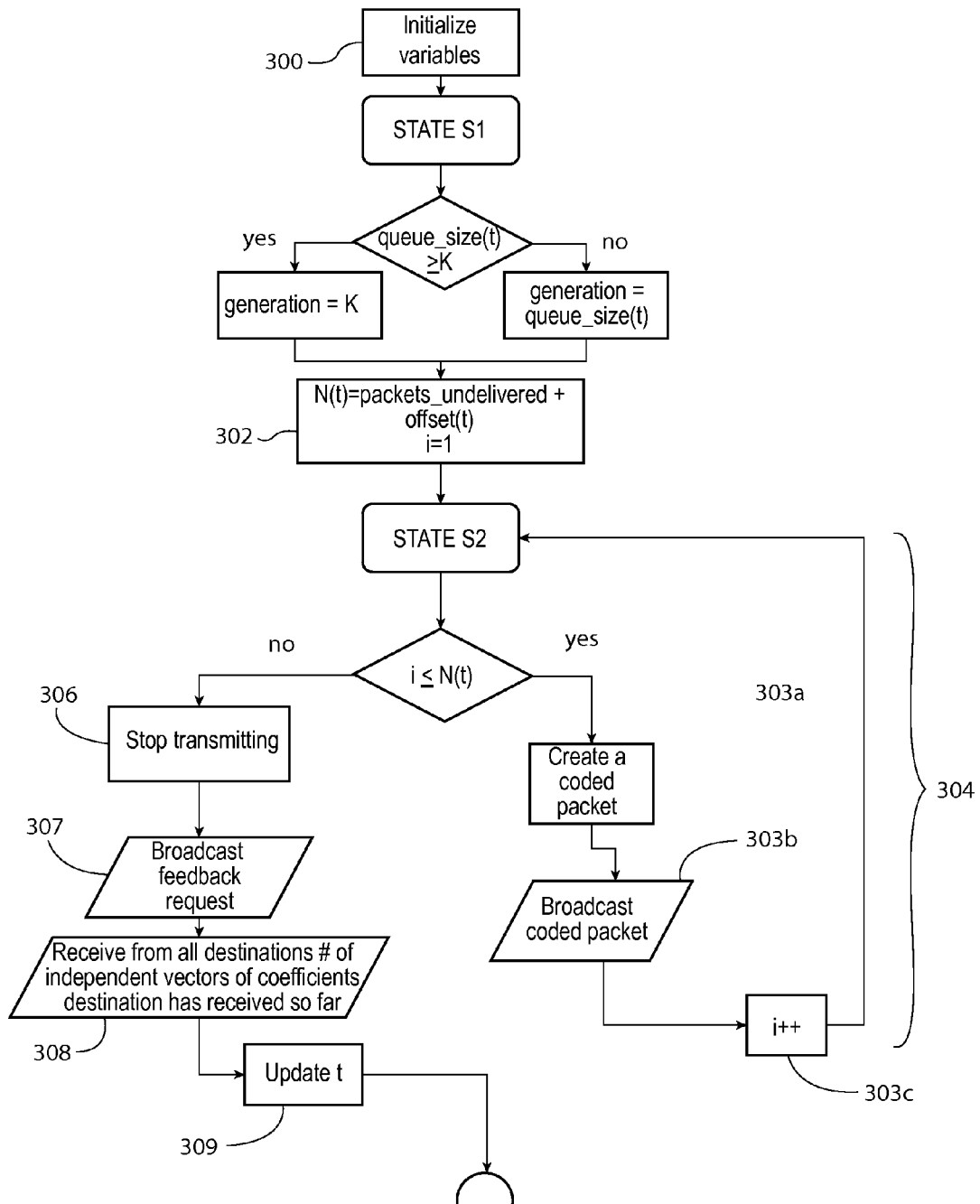
FIGS. 3a-3c is a logic flow diagram showing operation of a method, and a result of execution of computer program instructions embodied on a computer readable memory, by a source shown in FIG. 1.
Figure 3B:
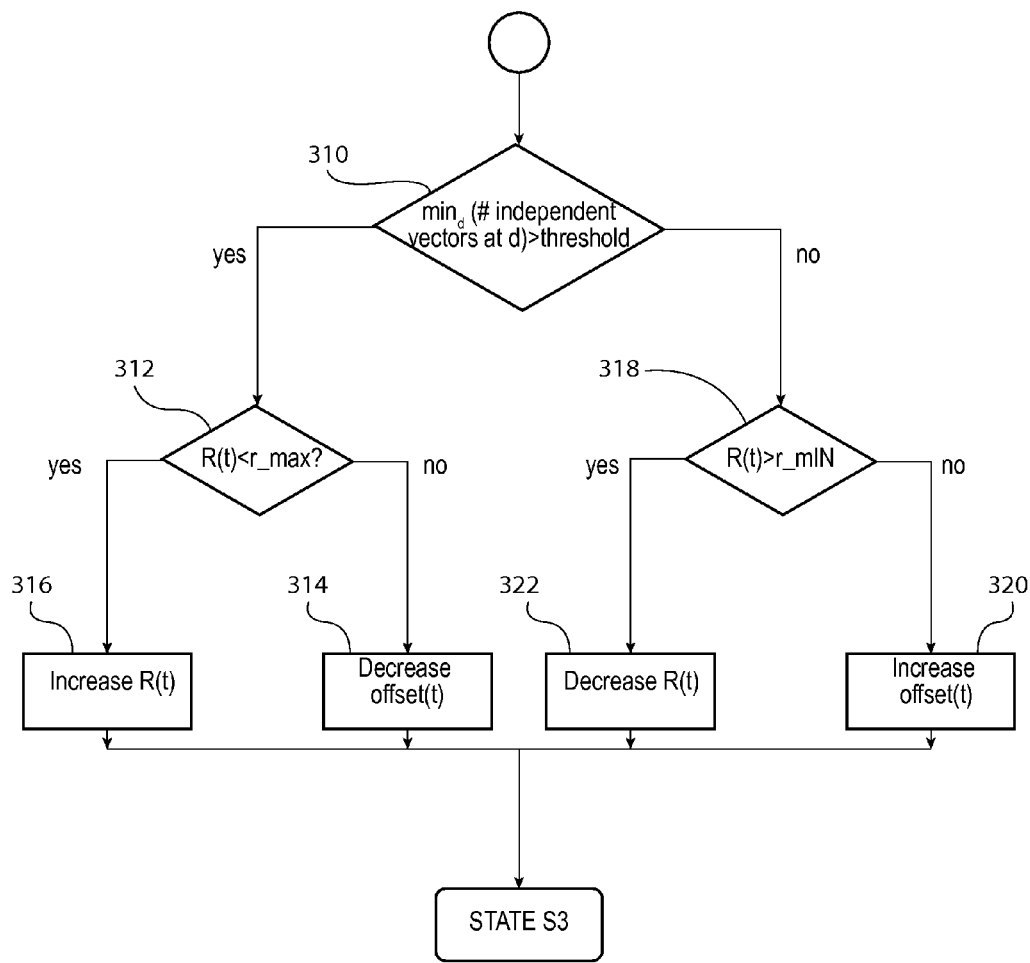
Figure 3C:
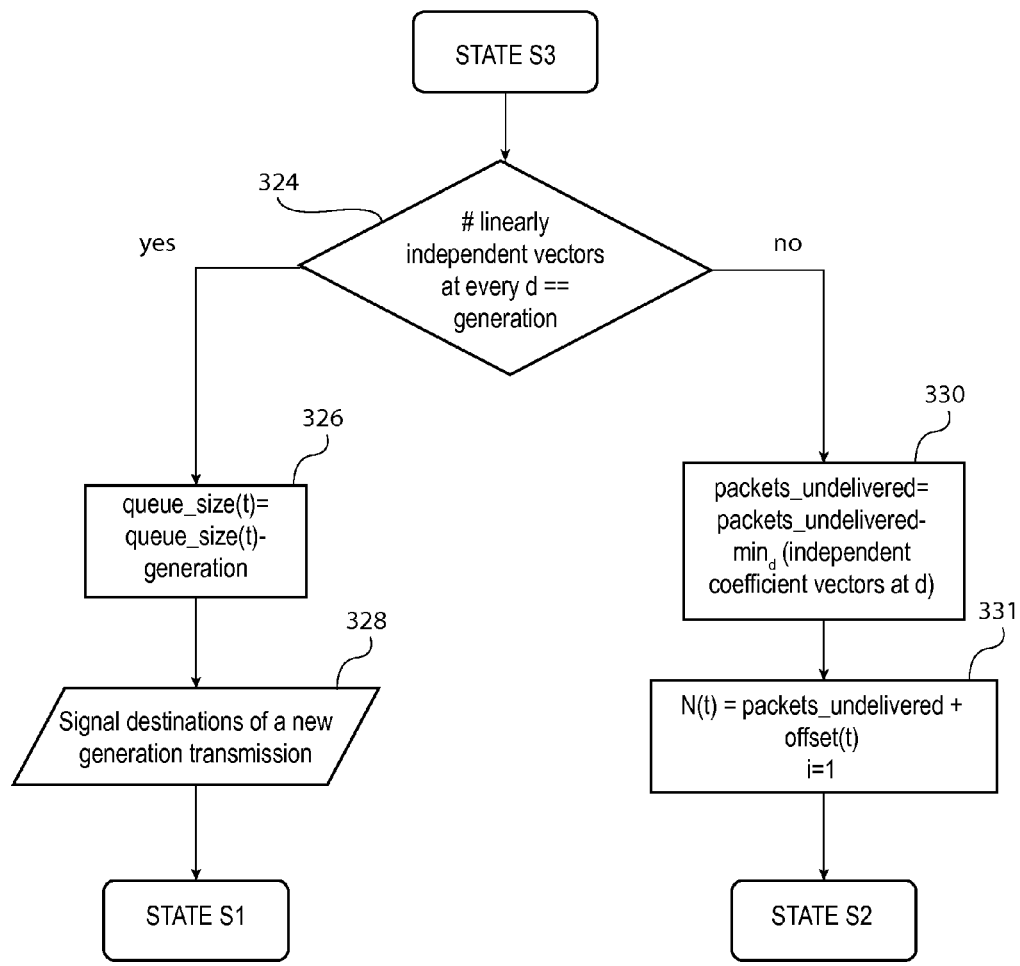

The following passages and FIGS. 3a-3c describe the functionality of the source 100 when configured according to exemplary embodiments.

Turning firstly to FIG. 3a, it is assumed that the source 100 will multicast a given content, initialized to the queue size at timeslot t, to two destination devices 110a, 110b that have registered for the content. At step 300 the source initializes the variables that it uses to configure transmission of the multicast content. In particular, the source 100 identifies a value for a variable "offset", which represents how many random linear network coded packets should be transmitted to account for the errors in the channels, and to avoid requesting feedback too early. In addition, a variable "packets_undelivered" is set to a value of parameter "generation". This parameter "generation" is configurable and its value may be selected according to predetermined quality of service performance parameters, e.g. relating to average delay or minimum transmission rate requirements. Next, the source 100 selects a "generation" of packets from its queue. In the event that the queue contains fewer than K packets, all K are selected; however, if the queue comprises K or more packets, K packets are selected e.g. according to the known First In First Out (FIFO) scheme. In the event that the queue is empty, the source 100 idles, pending receipt of packets into the queue.

In the Figures and the passages below, the term transmission instance is used to refer to a timeslot t for multicast transmission of random linear network coded packets that have been selected from the queue. The initial value of the offset variable (offset(1)) is preferably computed from a packet error rate determined by the source 100 on the basis of messages that the source 100 has exchanged with the destination devices 110a, 110b in establishing the multicast group. For instance, if a packet has m symbols and it is assumed that successful transmission of the packet occurs when all symbols are received successfully, the source 100 can heuristically estimate the packet error rate based on the number of packets that the destination devices successfully decoded. Alternatively, and if an error correction code is used, m will represent the number of symbols that are sufficient for a destination device to decode the packet.

The probability of packet error can be computed according to:

$$Pr_{packet}(\text{error}) = (1 - Pr_{symbol}(\text{success})^m) \quad (1)$$

If N(t) packets were sent but a destination device decoded only L packets then the estimated packet error rate at the source is:

$$Pr_{packet}(\text{error}) = 1 - \frac{L}{N(t)} \quad (2)$$

By equating (1) and (2), the source 100 can heuristically estimate the probability with which a symbol is successfully decoded given the current transmission rate and power used to transmit the packets, and therefore estimate the channel conditions (or the energy at the different destination devices). These estimated channel conditions are used to determine an initial value for the offset parameter, which is a number of additional random linear network coded packets that are to be multicast order to decrease the chances of all destination devices 110a, 110b being unable to decode the generation of original packets by the time feedback is requested from the source 100.

At step 302 the initial value determined for the offset variable (offset(1)) is added to the variable packets_undelivered computed at step 300.

In State S2, the source 100 successively creates and broadcasts 303a, 303b a coded packet at transmission rate R(t). The transmission rate R(t) for a given transmission instance is constant, and can be configured within an upper transmission rate, $r_{max}$, and a lower transmission rate, $r_{min}$. When the source 100 is configuring transmission of a first generation packets, a rate $R(1) \epsilon [r_{min}, r_{max}]$ may be chosen.

Process 304 is an iterative process whereby a packet is created and broadcast 303a, 303b on each iteration of the transmission instance, incrementing counter i at step 303c until the number of broadcast transmissions for the transmission instance equals N(t). Once the number of transmissions equals N(t), the source 100 stops transmitting (step 306), and the transmission instance is complete. The source 100 then waits for data from the destination devices indicative of the progress in decoding the coded packets by all of the destination devices (step 308), and then updates t (step 309)

There are several ways of soliciting the information received at step 308 from the destination devices, one of which is shown in FIG. 3a as step 307. This involves the source 100 broadcasting a request message to the destination devices, thereby "pulling" the decoding performance from individual destination devices. An alternative method involves the source 100 adding data indicative of the number of transmissions N(t) that are to be sent to the header of each coded message transmitted at step 304. This information is used to configure individual destination devices to notify the source 100 of the decoding performance after receiving N(t) transmissions. Preferably this data is added to all coded packets so that if, e.g. the first message is lost, and assuming that at least one packet is received by all destination devices, the destination device will be able to configure itself accordingly. As a further alternative, each destination device can be configured with a timer.

Irrespective of the mechanism employed to gather the decoding performance, the destination devices 110a, 110b preferably only respond if they could not decode all of the random linearly coded packets broadcast at successive iterations of step 304.

Referring now to FIG. 3b, at step 310 the source 100 determines the minimum number of packets that can be correctly decoded at any one of the destination devices 110a, 110b from the number of linearly independent rows of matrix A maintained by each destination device, this having been notified to the source 100 at step 308. This information is used to modify one of the transmission rate (R(t)) and number of the aforementioned extra packets (offset) to be transmitted in the next transmission instance, as will now be described.

In the event that the minimum number of packets that can be decoded by any one of the destination devices 110a, 110b is determined to be greater than a predetermined threshold (step 310), which may be determined by the Quality of Service parameters of the channel, the source 100 then compares the transmission rate R(t) for the previously transmitted set against the aforementioned upper transmission rate, $r_{max}$ (step 312). If $R(t) = r_{max}$, the source 100 decreases the value of the offset (step 314), relative to the value of the offset configured for the previously transmitted set offset(t). This corresponds to a scenario in which the channel conditions between the source 100 and all of the destination devices 110a, 110b are relatively good, in that it means the source 100 can continue transmitting at the maximum rate and decrease the number of additional packets that are required to be transmitted in order for the destination devices to reliably receive multicast packets.

If however, $R(t) < r_{max}$, the source 100 increases the rate of transmission that will be used in the transmission of the next, or current, set (step 316). The amount by which the rate is increased up to the upper limit $r_{max}$ for the next transmission instance may be dependent upon factors such as the fluctuations of the underlying channel conditions, performance, Quality of Service parameters, etc.

Returning to decision step 310, in the event that the minimum number of packets that can be decoded at any one of the destination devices 110a, 100b is determined to be less than the predetermined threshold, the source 100 then compares the transmission rate R(t) for the previously transmitted set against the aforementioned lower transmission rate, $r_{max}$ (step 318). If $R(t) = r_{min}$, the source increases the value of the offset (step 320) relative to the value of the offset configured for the previously transmitted set offset(t). This corresponds to a scenario in which the channel conditions between the source 100 and at least one of the destination devices 110a, 110b are relatively poor. Since the transmission rate R(t) cannot be further decreased, then in order to increase the chance of all of the destination devices 110a, 110b being able to reliably receive multicast packets, the source 100 has to increase the number of extra random linear network coded packets that are transmitted during the next transmission instance.

If, however, $R(t) > r_{min}$, the source 100 decreases the rate of transmission that will be used in the transmission of the next, or current, set (step 322). The amount by which the rate is decreased down to the lower limit $r_{min}$ for the next transmission instance may be dependent upon factors such as the fluctuations of the underlying channel conditions, performance, Quality of Service parameters, etc.

Having configured the transmission rate and/or value of the offset variable for the next set of transmissions, the source 100 invokes State S3, which will be described with reference to FIG. 3c. At step 324 the source 100 compares the linearly independent rows of matrix A maintained by each destination device with the value of parameter "generation". As described above, in one arrangement destination devices do not provide feedback to the source 100 when all of the packets can be correctly decoded, so the source can perform this assessment on the basis of the absence of notification messages.

In the event that the entire generation of random linear network coded packets can be correctly decoded, the queue size is decreased by "generation" number of packets (step 326). The source 100 then notifies the destination devices 110a, 110b that a new generation of packets will be transmitted (step 328), and the source 100 is configured to revert to State S1 and select a new set of "generation" packets from the queue. The source 100 then steps through States S1, S2 and S3 for this set of packets as described above, with the value for transmission rate or offset that was configured at one of steps 314, 316.

However, in the event that one or more destination devices 110a, 110b is unable to decode all of the packets transmitted in the previous transmission instance, the source 100 uses the minimum number of coded packets that can be decoded, $min_d$ (independent coefficient vectors at destination device d), to reconfigure the number of undelivered packets (step 330), configures N(t) for the next transmission instance (step 331), and reverts to State S2 with the value for transmission rate or offset that was configured at one of steps 330, 322.

The source 100 cycles through States S1-S3 indefinitely, or at least for as long as there are packets in the queue, and there are destination devices 110a, 110b that register to receive content from the source 100.

Figure 4:
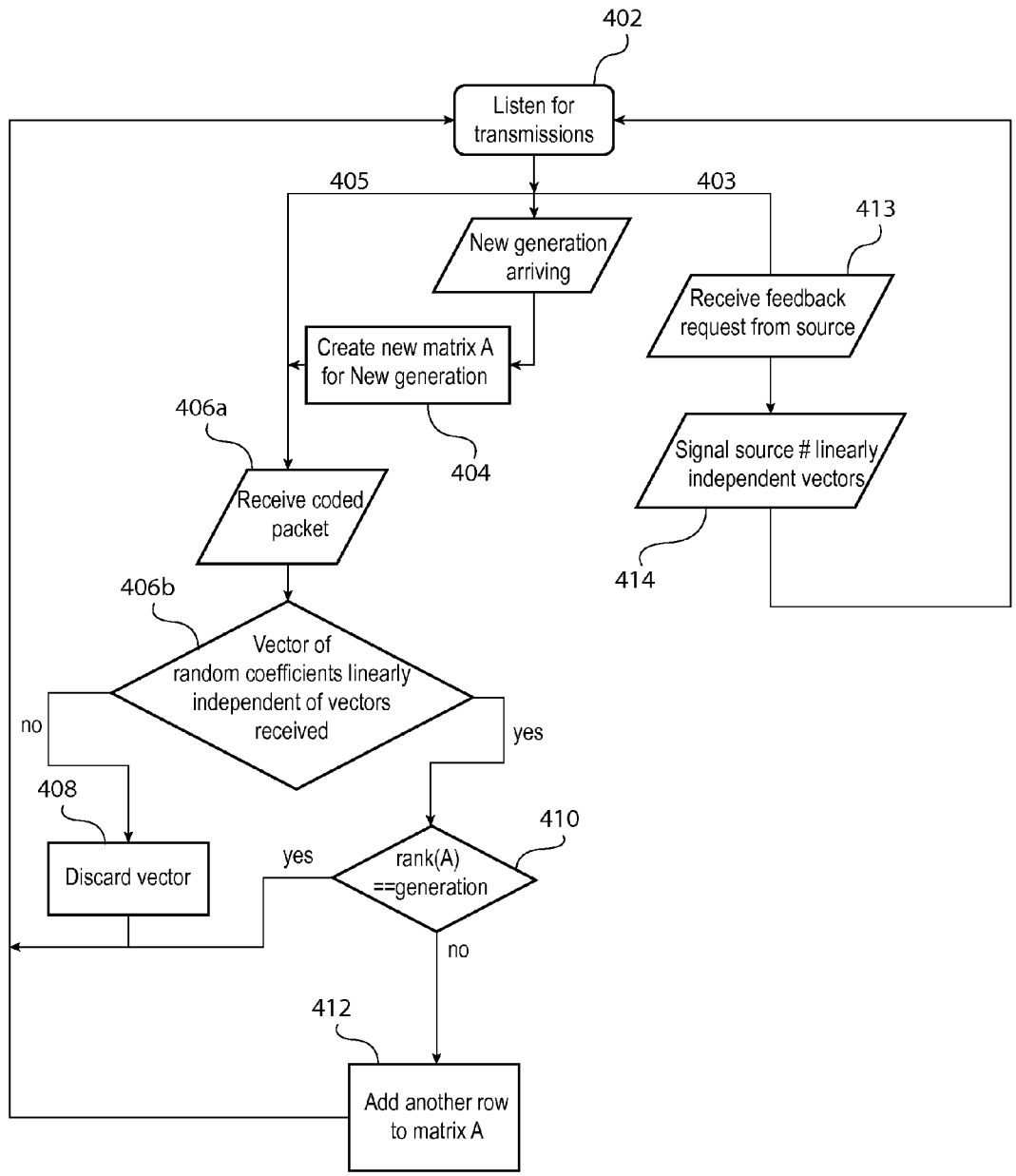
FIG. 4 is a logic flow diagram showing operation of a method, and a result of execution of computer program instructions embodied on a computer readable memory, by a destination device shown in FIG. 1.

FIG. 4 shows an exemplary embodiment of the steps performed by one of the destination devices, such as device 110a, when receiving random linear network coded packets multicast by the source 100 in the manner described above. The destination device 110a listens for incoming multicast transmissions (step 402) and distinguishes between a request for feedback (branch 403) and receipt of random linear network coded packets (branch 405). As regards branch 405, the destination device 110a identifies and processes a new generation of random linear network coded packets differently from retransmitted random linear network coded packets. Specifically, in the event that the destination device 110a receives a new generation of packets, the destination device 110a creates a new matrix (step 404), this being unnecessary for retransmitted random linear network coded packets. Irrespective of the type of incoming packets (new generation or old generation), the destination device 110a determines whether or not the vector of random coefficients is linearly independent of vectors received so far (step 406b), discarding those that are not independent (step 408), while assessing the rank of the matrix (step 410) for those that are independent and selectively adding a row to the matrix maintained by the destination device 110a for the current generation of packets (step 412).

In the event that the destination device 110a is configured to transmit its decoding performance in response to a request from the source 100 (step 413), the performance information is sent via a feedback channel. The destination devices 110a, 110b may be configured with orthogonal frequencies on the feedback channel, in which they can transmit the decoding performance information without having to take account of the effect on transmissions by other destination devices. However, if the destination devices 110a, 110b share a common channel, then a multiple access scheme is required. For example, conventional Carrier Sense Multiple Access (CSMA)/Collision Avoidance (CA) can be implemented on the return channel: in this scenario the destination devices 110a, 110b monitor the appropriate channel, and, responsive to detection that the channel is unoccupied, feedback is transmitted to the source 100. Alternatively, individual destination devices can signal each other to as to determine which device sends the feedback first, which second and so on. The priorities could be set based on an increasing (or decreasing) order of the identity of the destination devices The destination devices can alternatively be configured to report their decoding performance on the basis of the aforementioned header and timing mechanisms. As regards the former (header), the destination devices 110a, 110b can be configured with suitable means for extracting the number of transmissions associated with a transmission instance from the header. The destination devices 110a, 110b can be configured with means for monitoring the number of random linear network coded packets received from the source 100, and, when the received number matches the number expected for the current transmission instance, to report their decoding performance in the manner described above (step 416).

As regards the latter (timing), each destination device can be configured with a timer, and, when a destination device determines the channel to be idle for more than a predetermined time, it notifies the source 100 of its decoding performance. In this alternative it is to be noted that the timers need not be configured identically at all devices, since it is likely that different destination devices have different processing capabilities.

Figure 2:
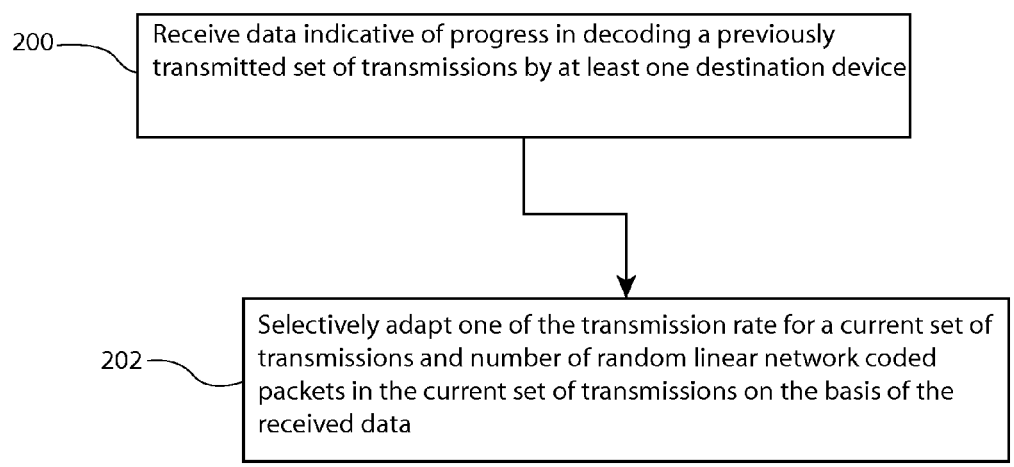
FIG. 2 is a logic flow diagram that illustrates the operation of a method, and a result of execution of computer program instructions embodied on a computer readable memory, by a source of FIG. 1 in accordance with the exemplary embodiments of this invention.

FIG. 2, described above, represents steps executed by a computer program or an implementing algorithm stored in the local memory of the source 100, as well as illustrating the operation of a method and a specific manner in which the processor and memory with computer program/algorithm are configured to cause that source 100 (or one or more components thereof) to operate. The various blocks shown in FIG. 2 may also be considered as a plurality of coupled logic circuit elements constructed to carry out the associated function(s), or specific result or function of strings of computer program code stored in a computer readable memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 5:
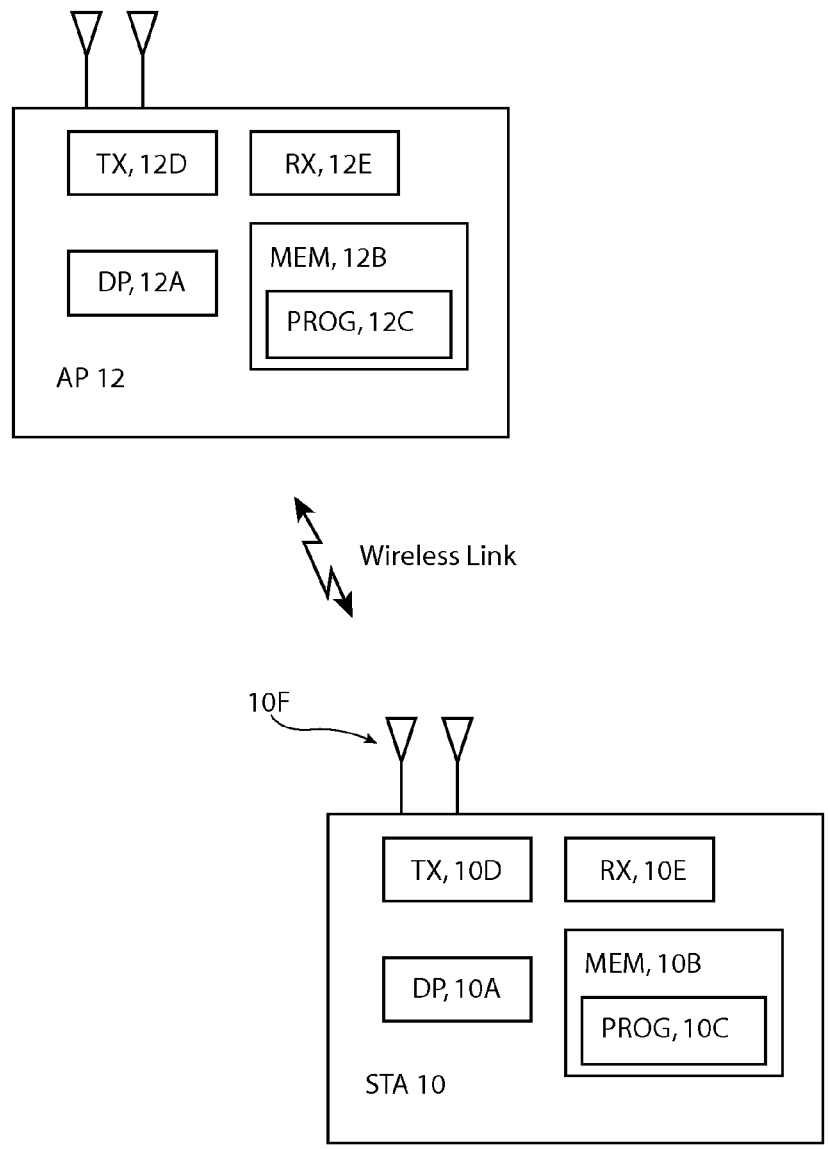
FIG. 5 is a simplified block diagram of a radio access point and a mobile station, which are exemplary devices suitable for use in practicing the exemplary embodiments of the invention and that may be configured to perform the method of FIGS. 2-4.

Reference is now made to FIG. 5 for illustrating a simplified block diagram of various electronic devices and apparatus that are suitable for use in practicing the exemplary embodiments of this invention. In FIG. 5 a serving cell/network access node 12 is adapted for multicast communication over a wireless link to one or more mobile apparatus, such as mobile terminals or STA 10. The STA 10 corresponds to destination devices 110a, . . . , 110g shown in FIG. 1. The network access node 12 may be a WLAN access point AP as identified at FIG. 5, an eNodeB (of an E-UTRAN system), a NodeB, a remote radio head or relay station, or other type of base station/cellular access node. This node 12 corresponds to sources 100a, 100b, 100c shown in FIG. 1.

The STA 10 includes processing means such as at least one data processor (DP) 10A, storing means such as at least one computer-readable memory (MEM) 10B storing at least one computer program (PROG) 10C, and also communicating means such as a transmitter TX 10D and a receiver RX 10E for bidirectional wireless communications with the network access node 12 via one or more antennas 10F. The computer program 10C comprises a set of instructions that, when executed by the associated DP 10A, enable the STA to operate in accordance with the exemplary embodiments described with reference to FIG. 4. In these regards the exemplary embodiments of this invention may be implemented at least in part by computer software stored on the MEM 10B, or by hardware, or by a combination of tangibly stored software and hardware (and tangibly stored firmware).

The network access node 12 similarly includes processing means such as at least one data processor (DP) 12A, storing means such as at least one computer-readable memory (MEM) 12B storing at least one computer program (PROG) 12C, and communicating means such as a transmitter TX 12D and a receiver RX 12E for bidirectional wireless communications with the STA 10 via one or more antennas 12F. The computer program 12C comprises a set of instructions that, when executed by the associated DP 12A, enable the network access node 12 to operate in accordance with the exemplary embodiments described with reference to FIGS. 2 and 3a-3c. In these regards the exemplary embodiments of this invention may be implemented at least in part by computer software stored on the MEM 12B, or by hardware, or by a combination of tangibly stored software and hardware (and tangibly stored firmware).

Various embodiments of the computer readable MEMs 10B, 12B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 12A include but are not limited to general purpose computers, special purpose computers, microprocessors, digital signal processors (DSPs) and multi-core processors.

The above exemplary embodiments are to be understood as illustrative examples of the invention. Further embodiments of the invention are envisaged. For example, whilst the embodiments are described with reference to packets being multicast to a plurality of devices it will be appreciated that the exemplary embodiments apply to one-to-all, one-to-many and one-to-one communication between source and destination devices. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method of controlling transmission of a set of transmissions from a source device to at least one destination device according to a multicast transmission scheme, the set of transmissions comprising a configurable number of random linear network coded packets that are to be multicast by the source device to the at least one destination device at a configurable transmission rate, the method comprising:
   receiving, from said at least one destination device, data indicative of progress in decoding a previously transmitted set of transmissions by said at least one destination device; and
   selectively adapting one of transmission rate for a current set of transmissions and number of random linear network coded packets in the current set of transmissions on the basis of the received data;
wherein:
the number of random linear network coded packets in the current set is selected on the basis of said data indicative of progress in decoding the previously transmitted set of transmissions by said at least one destination device; and
the data indicative of the progress is used to determine
   a first number corresponding to a number of random linear network coded packets of the previously transmitted set that have yet to be decoded, and
   a second number corresponding to a number of extra random linear network coded packets that are to be transmitted, in which a number of random linear network coded packets in the current set comprises the first number and the second number.

2. A method according to claim 1, in which the transmission rate is adapted within an upper transmission rate and a lower transmission rate on the basis of said data indicative of progress in decoding a previously transmitted set of transmissions by said at least one destination device.

3. A method according to claim 2, in which the transmission rate is increased up to a maximum value given by said upper transmission rate in the event that said data indicative of progress in decoding a previously transmitted set of transmissions by said at least one destination device exceeds a predetermined threshold.

4. A method according to claim 2, in which the transmission rate is decreased down to a minimum value given by said lower transmission rate in the event that said data indicative of progress in decoding a previously transmitted set of transmissions by said at least one destination device is less than a predetermined threshold.

5. A method according to claim 1, in which the second number is selectively decreased in the event that:
   a) said data indicative of progress in decoding a previously transmitted set of transmissions by said at least one destination device exceeds a predetermined threshold; and
   b) the rate of transmission for said previously transmitted packets is equal to a predetermined upper rate of transmission.

6. A method according to claim 1, in which the second number is selectively increased in the event that:
   a) said data indicative of progress in decoding a previously transmitted set of transmissions by said at least one destination device is less than a predetermined threshold; and
   b) the rate of transmission for said previously transmitted packets is equal to a predetermined lower rate of transmission.

7. A method according to claim 1, further comprising broadcasting a request message to said at least one destination device after transmission of said previously transmitted set of transmissions, said request message requesting data indicative of progress in decoding a previously transmitted set of transmissions by said at least one destination device.

8. A method according to claim 1, in which each transmission in a given set of packets comprises a header, the header being for use in triggering transmission by said at least one destination device of data indicative of progress in decoding a previously transmitted set of transmissions by said at least one destination device, and comprising data indicative of a number of individual transmissions making up the given set.

9. A method according to claim 1, in which the current set of transmissions are multicast to said at least one destination device over a wireless network.

10. A method according to claim 1, in which the source transmits the set of transmissions to a plurality of destination devices, and the method comprises selectively adapting one of the transmission rate for a current set of transmissions and the number of random linear network coded packets in the current set of transmissions on the basis of the poorest level of progress in decoding the previously transmitted set of transmissions by all of the destination devices.

11. Apparatus for controlling transmission of a set of transmissions from a source device to at least one destination device according to a multicast transmission scheme, the set of transmissions comprising a configurable number of random linear network coded packets that are to be multicast by the source device to the at least one destination device at a configurable transmission rate, the apparatus comprising a processing system, the processing system comprising at least one processor and a memory storing a set of computer instructions, in which the processing system is arranged to:
  receive, from said at least one destination device, data indicative of progress in decoding a previously transmitted set of transmissions by said at least one destination device; and
  selectively adapt one of transmission rate for a current set of transmissions and number of random linear network coded packets in the current set of transmissions on the basis of the received data;
wherein the data indicative of the progress is used to determine
  a first number corresponding to number random linear network coded packets of the previously transmitted set that have yet to be decoded, and
  a second number corresponding to a number of extra random linear network coded packets that are to be transmitted,
in which the processing system is arranged to configure the number of random linear network coded packets in the current set on the basis of the first number and the second number.

12. Apparatus according to claim 11, in which the processing system is arranged to adapt the transmission rate within an upper transmission rate and a lower transmission rate on the basis of said data indicative of progress in decoding a previously transmitted set of transmissions by said at least one destination device.

13. Apparatus according to claim 12, in which the processing system is arranged to increase the transmission rate up to a maximum value given by said upper transmission rate in the event that said data indicative of progress in decoding a previously transmitted set of transmissions by said at least one destination device exceeds a predetermined threshold.

14. Apparatus according to claim 12, in which the processing system is arranged to decrease the transmission rate down to a minimum value given by said lower transmission rate in the event that said data indicative of progress in decoding a previously transmitted set of transmissions by said at least one destination device is less than a predetermined threshold.

15. Apparatus according to claim 11, in which the processing system is arranged to decrease said second number in the event that:
  a) said data indicative of progress in decoding a previously transmitted set of transmissions by said at least one destination device exceeds a predetermined threshold; and
  b) the rate of transmission for said previously transmitted packets is equal to a predetermined upper rate of transmission.

16. Apparatus according to claim 11, in which the processing system is arranged to increase said second number in the event that:
  a) said data indicative of progress in decoding a previously transmitted set of transmissions by said at least one destination device is less than a predetermined threshold; and
  b) the rate of transmission for said previously transmitted packets is equal to a predetermined lower rate of transmission.

17. A computer readable memory storing a computer program comprising a set of instructions to be executed by a computing device, the computing device being arranged to control transmission of a set of transmissions from the computing device to at least one destination device according to a multicast transmission scheme, the set of transmissions comprising a configurable number of random linear network coded packets that are to be multicast by the computing device to the at least one destination device at a configurable transmission rate,
  wherein, when the set of instructions are executed by the computing device, the computing device is caused to perform the steps of:
  receiving, from said at least one destination device, data indicative of progress in decoding a previously transmitted set of transmissions by said at least one destination device; and
  selectively adapting one of transmission rate for a current set of transmissions and number of random linear network coded packets in the current set of transmissions on the basis of the received data;
wherein the data indicative of the progress is used to determine
  a first number corresponding to a number of random linear network coded packets of the previously transmitted set that have yet to be decoded, and
  a second number corresponding to a number of extra random linear network coded packets that are to be transmitted,
and wherein the number of random linear network coded packets in the current set is configured on the basis of the first number and the second number.

* * * * *